(12) United States Patent
Huang et al.

(10) Patent No.: US 8,098,334 B2
(45) Date of Patent: Jan. 17, 2012

(54) SYSTEM AND PROCESS FOR IMAGE RESCALING WITH EDGE ADAPTIVE PHASE CONTROL IN INTERPOLATION PROCESS

(75) Inventors: Yong Huang, Singapore (SG); Fritz Lebowsky, St. Martin D'Uriage (FR); Haiyun Wang, Singapore (SG); Lucas Hui, Singapore (SG)

(73) Assignees: STMicroelectronics SA, Montrougue (FR); STMicroelectronics Asia Pacific Pte., Ltd., Singapore (SG)

( * ) Notice: Subject to any disclaimer, the term of this patent is extended or adjusted under 35 U.S.C. 154(b) by 500 days.

(21) Appl. No.: 12/406,832

(22) Filed: Mar. 18, 2009

(65) Prior Publication Data

US 2009/0262247 A1   Oct. 22, 2009

(30) Foreign Application Priority Data

Mar. 20, 2008   (SG) ................................ 200802271-7

(51) Int. Cl.
*H04N 5/21*   (2006.01)
(52) U.S. Cl. ...................................................... 348/625
(58) Field of Classification Search .................. 348/625, 348/615, 607, 26, 627–629, 606; 382/266, 382/199, 275; 345/697, 600
See application file for complete search history.

(56) References Cited

U.S. PATENT DOCUMENTS

| | | | | |
|---|---|---|---|---|
| 4,885,631 | A * | 12/1989 | Fukinuki et al. | 348/436.1 |
| 5,311,305 | A * | 5/1994 | Mahadevan et al. | 348/169 |
| 5,901,252 | A * | 5/1999 | Kawakami et al. | 382/276 |
| 5,926,174 | A * | 7/1999 | Shibamiya et al. | 345/213 |
| 6,229,578 | B1 * | 5/2001 | Acharya et al. | 348/607 |
| 7,268,822 | B2 * | 9/2007 | Kang et al. | 348/448 |
| 7,319,496 | B2 * | 1/2008 | Uchida et al. | 348/625 |

* cited by examiner

*Primary Examiner* — Paulos Natnael

(57) ABSTRACT

A video image processing system is described that generates the interpolated video images with sharp and jaggedness-free edges. A method of video image processing is also described that interpolates video images to generate the video images with sharp and jaggedness-free edges. The video image processing system receives and makes input image data available for further processing; analyzes the local features of the input image data; filters the input image data before performing interpolation process; modifies the phase value adaptive to the local edge distance; rescales the input image data in horizontal interpolation using the modified phase value; and rescales the horizontally interpolated image data in vertical interpolation using modified phase value.

24 Claims, 6 Drawing Sheets

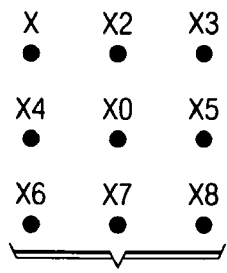
FIG. 3
| EDGE ANGLE RANGE | QUOTIENT | GRADIENT SIGN | | | EDGE DIRECTION |
| --- | --- | --- | --- | --- | --- |
| | | Gx | Gy | \|Gx\|−\|Gy\| | |
| 0-45 | 0-45 | 0 | 0 | 0 | 0+QUOTIENT |
| 45-90 | 45-0 | 0 | 0 | 1 | 90−QUOTIENT |
| 90-135 | 0-45 | 1 | 0 | 1 | 90+QUOTIENT |
| 135-180 | 45-0 | 1 | 0 | 0 | 180−QUOTIENT |
| 180-225 | 0-45 | 1 | 1 | 0 | 180+QUOTIENT |
| 225-270 | 45-0 | 1 | 1 | 1 | 270−QUOTIENT |
| 270-315 | 0-45 | 0 | 1 | 1 | 270+QUOTIENT |
| 315-360 | 45-0 | 0 | 1 | 0 | 360−QUOTIENT |
FIG. 4
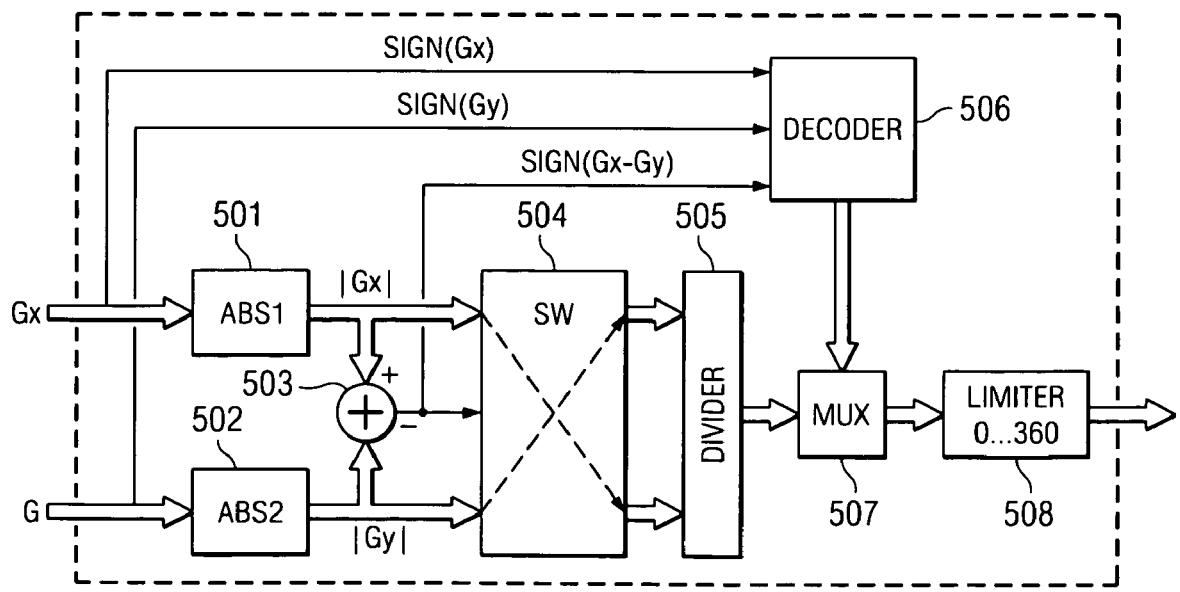
FIG. 5

SYSTEM AND PROCESS FOR IMAGE RESCALING WITH EDGE ADAPTIVE PHASE CONTROL IN INTERPOLATION PROCESS

CROSS-REFERENCE TO RELATED APPLICATION AND CLAIM OF PRIORITY

The present application claims the benefit under 35 U.S.C. §119(a) of a Singapore patent application filed in the Singapore Intellectual Property Office on Mar. 20, 2008 and assigned Serial No. 200802271-7, the entire disclosure of which is hereby incorporated by reference.

TECHNICAL FIELD OF THE INVENTION

The present invention generally relates to the field of digital image processing and, more particularly, to a system and process for image rescaling with an edge adaptive phase control in interpolation process.

BACKGROUND OF THE INVENTION

Digital images have become more and more popular in the field of image display because they offer clearness and less distortion during processing. In many circumstances, digital images have to undergo the process of resealing or resizing, where the resealing or resizing of digital images includes magnification or reduction of image. For example, large screen displays have a native resolution that reaches or exceeds the well-known high-definition TV (HDTV) standard. In order to display a low-resolution digital image on a large screen display, it is desirable to rescale the image to a full screen resolution.

In a magnification process, additional pixels are added into the original pixels. Then the size of the image is magnified so that the distance between adjacent pixels is maintained to be the same as that in the original digital image. Different methods are available to add the additional pixels. One method simply replicates pixels—adds a number of pixels surrounding every existing pixel to form a block of pixels with the same level. However, the simplicity itself results in a magnified image with jagged and/or blurred edges.

Another method generates additional pixels by a process of interpolation that substantially removes the blocks of unpleasant pixels and jagged edges. Interpolation is a common stage in image processing to improve the appearance of the processed image on the output imaging medium. Conventional image resealing methods using interpolation techniques usually use separable interpolation kernels to reduce the computational complexity. The separable interpolation kernels are performed in the horizontal direction first and then the vertical direction or vice verse. The kernel orientations in these implementations are set to limited levels of either horizontal or vertical. Upon encountering an oblique edge, the interpolation primarily uses the pixels on either side of an edge rather than the pixels along the edge, resulting in an interpolated edge that appears to be jagged or/and blurred.

One method is a modified bilinear interpolation method that prevents the interpolation from extending over the edges by using extrapolated estimates of pixel values for the pixels on the other side of the edge. However, this method requires iterative post-processing using a successive approximation procedure, which places high demands on memory and processing resources.

Another method selects interpolation kernels based on edge strength or user input. However, there are some consequences of the method. First, using edge strength alone as the basis of kernel selection does not provide sufficient information for reliable kernel selection (especially at oblique edges). Second, kernel selection solely based upon user input is impractical and cannot specify enough details. Generally, kernel selection needs to achieve both automatic and reliable so that the appropriate kernel can be applied on different edge strengths and edge directions which are typically found in images.

DETAILED DESCRIPTION OF THE INVENTION

A video image processing system is discloses. The video image processing system includes an input image data module configured to receive and make input image data available for further processing; a local image feature analysis module operably coupled with the input image data module, operable to receive the input image data and analyze the local features of the input image data, wherein the local features include gradient magnitude, edge direction and corners; an edge contour detection in sub-pixel accuracy module operably coupled with the local image feature analysis module, operable to receive the information of gradient magnitude and edge direction to detect the edge contour in sub-pixel accuracy; a local edge distance estimation module operably coupled with the edge contour detection in sub-pixel accuracy module, operable to receive the detected edge contour information and estimating the local edge distance from a to-be-interpolated pixel to the local edge contour; a pair of edge directional filters operably coupled with the input image data module, operable to filter the input image data before performing interpolation process; an adaptive horizontal phase control module and an adaptive vertical phase control module operably coupled with the local edge distance estimation module, operable to modify the phase value adaptive to the local edge distance; a horizontal interpolation module operably coupled with one of the edge directional filters and adaptive horizontal phase control module, operable to rescale the input image data in horizontal interpolation; and a vertical interpolation module operably coupled with one of the edge directional filters and adaptive vertical phase control module, operable to rescale the horizontally interpolated image data in vertical interpolation. The video image processing system is operable to interpolate the input image data, resulting in an output image with sharp and jaggedness-free edges.

A method of processing video images is disclosed. The method includes receiving and making input image data available for further processing; analyzing the local features of the input image data, wherein the local features include gradient magnitude, edge direction and corners; receiving the information of gradient magnitude and edge direction to detect the edge contour in sub-pixel accuracy; receiving the detected edge contour information and estimating the local edge distance from a to-be-interpolated pixel to the local edge contour; filtering the input image data before performing interpolation process; modifying the phase value adaptive to the local edge distance; resealing the input image data in horizontal interpolation using the modified phase value; and resealing the horizontally interpolated image data in vertical interpolation using modified phase value, wherein interpolated video images with sharp and jaggedness-free edges are generated.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

Preferred embodiments according to the present invention will now be described with reference to the Figures, in which like reference numerals denote like elements.

FIG. 3 illustrates an exemplary 3×3 neighborhood window for illustration of local gradient estimation;

FIG. 4 illustrates an exemplary table indicating the range of edge angles, the quotient values, the sign bits of $G_x$ and $G_y$ and $|G_x|-|G_y|$ samples in the respective angle range;

FIG. 5 illustrates a logical schematic diagram of the edge direction estimator in accordance with one embodiment of the present invention;

DETAILED DESCRIPTION OF THE INVENTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged digital imaging processing system.

The present invention may be understood more readily by reference to the following detailed description of certain embodiments of the invention.

A system and process are described for image resealing with an edge adaptive phase control in interpolation process. Briefly, the edge adaptive phase control shifts the phase of the interpolation kernel adaptively based on local edge distance. In one embodiment, the edge adaptive phase control includes edge directional filtering to reduce the noise and edge jaggedness of input image data, estimating local edge distance by combination of local image feature analysis and sub-pixel edge detection, and achieving edge adaptive interpolation by modifying the phase of interpolation kernel based on the estimated local edge distance.

Figure 1:
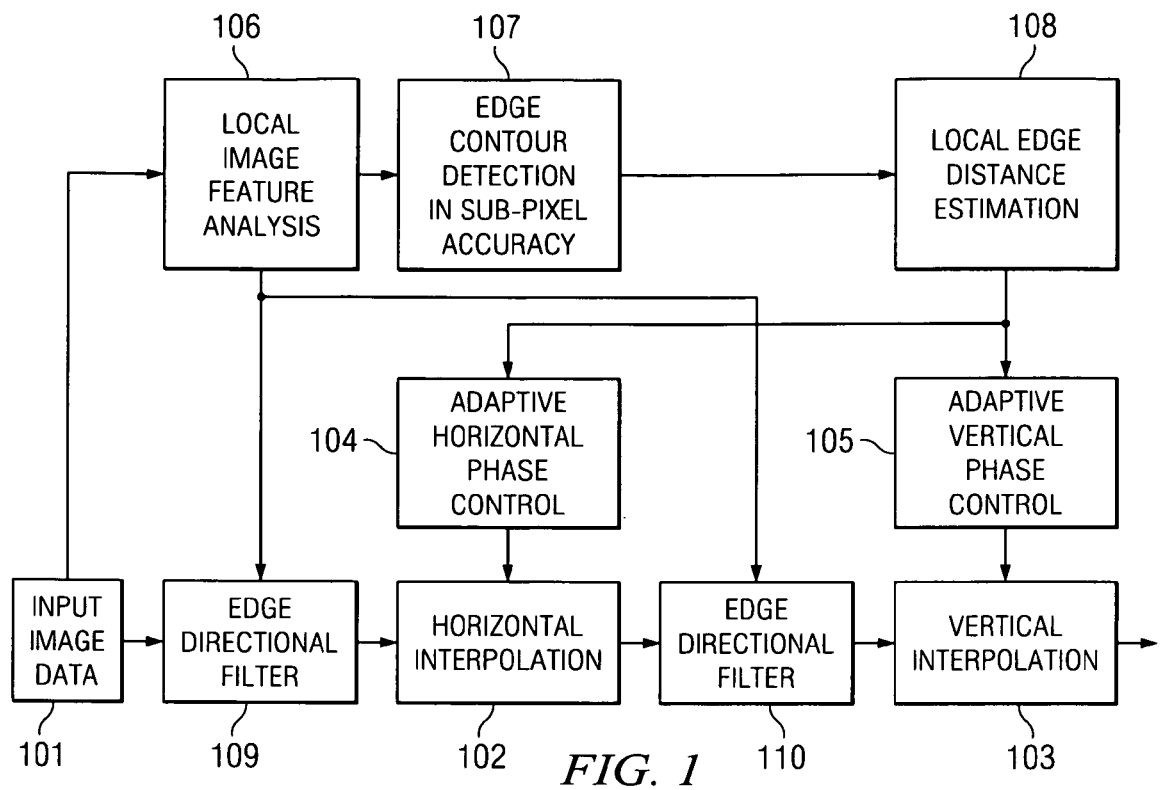
FIG. 1 illustrates a functional block diagram of the image processing system with adaptive phase control in accordance with one embodiment of the present invention.

Now referring to FIG. 1, there is provided a functional block diagram of the image processing system with adaptive phase control in accordance with one embodiment of the present invention. The image processing system 1 comprises an input image data module 101, a horizontal interpolation module 102, a vertical interpolation module 103, an adaptive horizontal phase control module 104, an adaptive vertical phase control module 105, a local image feature analysis module 106, an edge contour detection in sub-pixel accuracy module 107, a local edge distance estimation module 108, an edge directional filter 109, and an edge directional filter 110.

The input image data module 101 functions for receiving the input image data to be processed and temporarily storing the received input image data so as to make the stored input image data to be available for further processing. The input image data module 101 can be any electronic means that is suitable for performing the desired functions; such means are well known to those skilled in the art; thus there is no more details provided herein.

Figure 2:
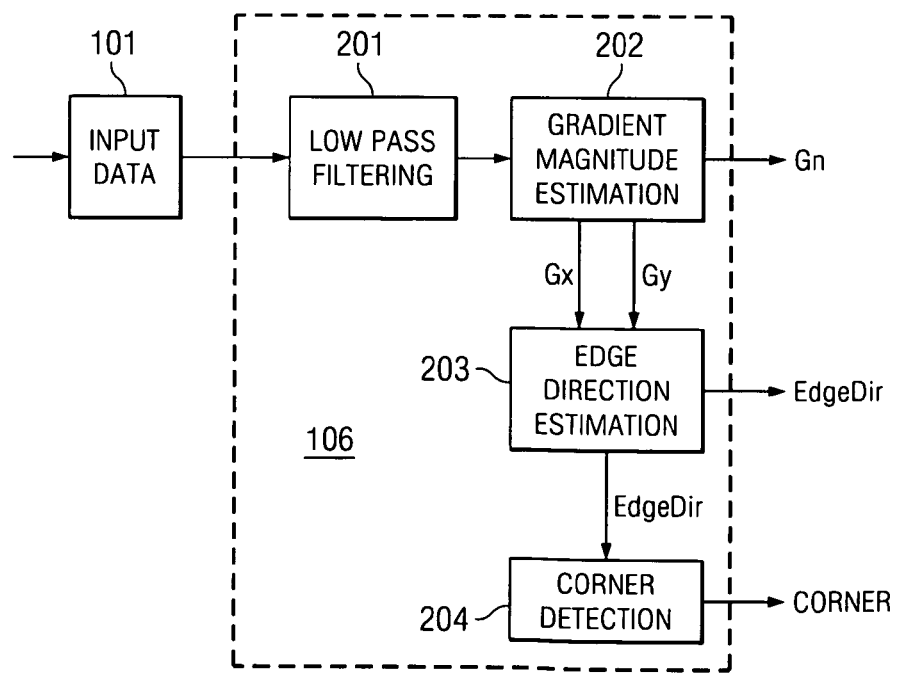
FIG. 2 illustrates a functional block diagram of the local image feature analysis module in accordance with one embodiment of the present invention.

Now referring to FIG. 2, there is provided a functional block diagram of the local image feature analysis module 106 in accordance with one embodiment of the present invention. As shown in FIG. 2, the local image feature analysis module 106 comprises a low pass filter 201, a gradient magnitude estimator 202, an edge direction estimator 203, and a corner detector 204. The low pass filter 201 is operably coupled with the input image data module 101, receiving and filtering the input image data to reduce the noise. In one embodiment, the low pass filter 201 is a Gaussian lowpass filter. The gradient magnitude estimator 202 is operably coupled with the low pass filter 201, receiving the filtered input image data and estimating the gradient magnitude in the horizontal direction $G_x$ and the vertical direction $G_y$, in an n×n neighborhood window, where the n can be any integral. FIG. 3 shows an exemplary 3×3 neighborhood window that will be used to illustrate the calculation of both gradient magnitudes $G_x$ and $G_y$. Based on a 3×3 neighborhood window, the gradient magnitudes in the horizontal direction $G_x$ and the vertical direction $G_y$ can be estimated according to the following Equations 1 and 2:

$$G_x=(X1+2*X2+X3-(X6+2*X7+X8))/4; \qquad \text{[Eqn. 1]}$$

$$G_y=(X1+2*X4+X6-(X3+2*X5+X8))/4; \qquad \text{[Eqn. 2]}$$

Accordingly, the local gradient magnitude can be estimated according to the following Equation 3:

$$G_n=(|G_x|+|G_y|)/2; \qquad \text{[Eqn. 3]}$$

Still referring to FIG. 2, the edge direction estimator 203 is operably coupled with the gradient magnitude estimator 202, receiving the estimated gradient values $G_x$ and $G_y$. The edge direction estimator 203 extracts the edge direction from the quotient defined by $|G_y|/|G_x|$ (when $|G_y|<|G_x|$) or $|G_x|/|G_y|$ (when $|G_y|>|G_x|$) combined with the signs of $G_x$ and $G_y$, respectively. FIG. 4 shows an exemplary table indicating the range of edge angles, the quotient values, the sign bits of $G_x$ and $G_y$ and $|G_x|-|G_y|$ samples in the respective angle range. In the 'sign' column, '0' represents positive and '1' negative. The final column, 'edge direction', illustrates a simple method of determining edge direction from the sign bits and the quotient values.

Now referring to FIG. 5, there is provided a logical schematic diagram of the edge direction estimator 203 in accordance with one embodiment of the present invention. As shown in FIG. 5, the edge direction estimator 203 comprises a pair of absolute value circuits 501, 502, a subtraction circuit 503, a switching circuit 504, a divider circuit 505, a logic decoder 506, a multiplexer 507 and a limiter 508. In operation, the gradient magnitudes $G_x$ and $G_y$ are respectively applied to the absolute value circuits 501, 502 which output only the magnitude of the input signals. $|G_x|$, the output of circuit 501, is passed to the subtraction circuit 503 as subtrahend, and $|G_y|$, the output of circuit 502, is passed to the subtraction circuit 503 as minuend. The output of the circuit 503 equals the difference between the two input signals, i.e., $|G_x|-|G_y|$. The sign bit of the calculation indicates which input signal to the subtraction circuit 503 has the largest magnitude. The switching circuit 504 receives $|G_x|$ and $|G_y|$ as major inputs and a signal indicative of the sign of $|G_x|-|G_y|$ as a control input; the control input ensures that the switch is operative such that the larger input signal is always directed to the following divider circuit 505 as divisor, and the smaller input signal is always directed to the divider circuit 505 as dividend.

Figure 6:
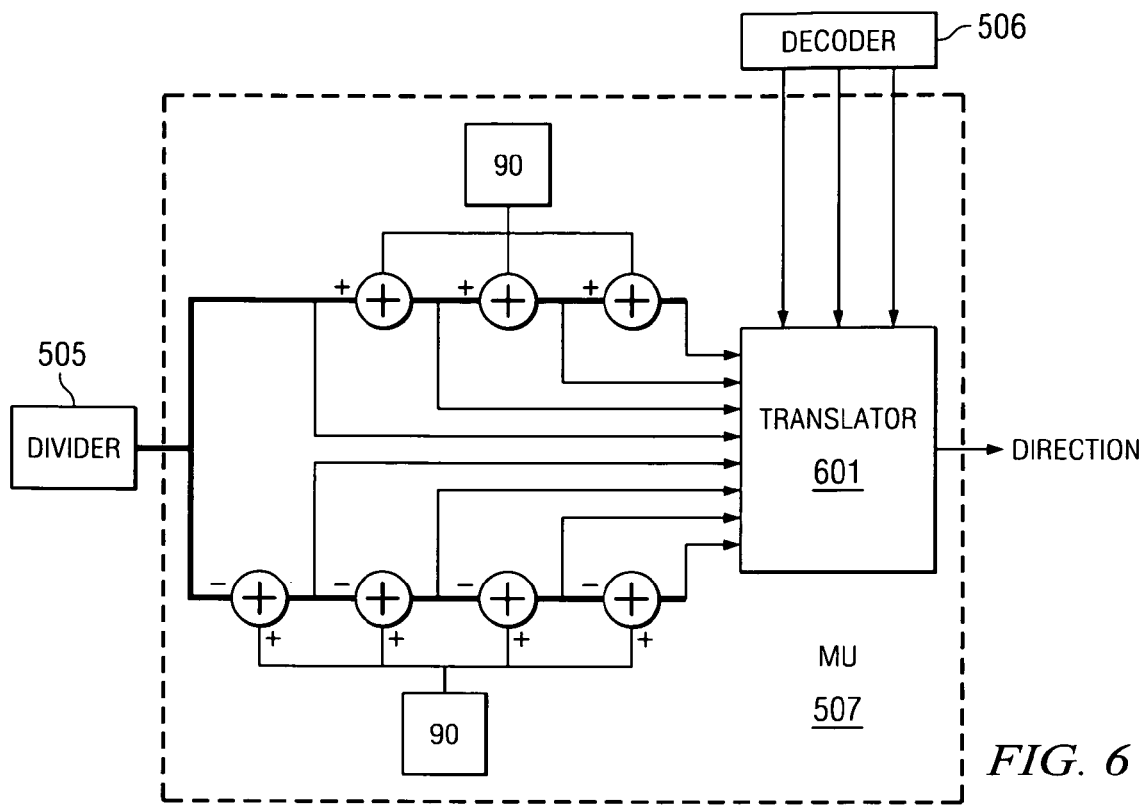
FIG. 6 illustrates a functional block diagram of the multiplexer in accordance with one embodiment of the present invention.

The divider circuit 505 acts on its input signals to generate a quotient value that is the input to the multiplexer 507. As shown in FIG. 6, there is provided a functional block diagram of the multiplexer 507 in accordance with one embodiment of the present invention. The multiplexer 507 comprises a plurality of adder units and a translator 601, where the input signals are augmented in the plurality of adder units to generate a series of possible angle values that are all fed into the translator 601, and where the translator 601 is in effect a further multiplexer. The control inputs from the logic decoder 506 to the translator 601 are derived from three digital signals representing the signs of $G_x$ and $G_y$ and $|G_x|-|G_y|$. These sign bits are decoded in the logic decoder 506 to create the three control bits required to select one of the eight inputs to the translator 601. In effect, the circuit of FIG. 6 places the results of the table of FIG. 4 into effect.

The output of the multiplexer 507 is fed into the limiter 508 to ensure that the eventual output of edge direction is limited in the range of 0 to 360.

Now referring back to FIG. 2, the corner detector 204 is operably coupled with the edge detection estimator 203, receiving the estimated edge directions to detect corners. The detection of corners includes two steps.

Figure 7:
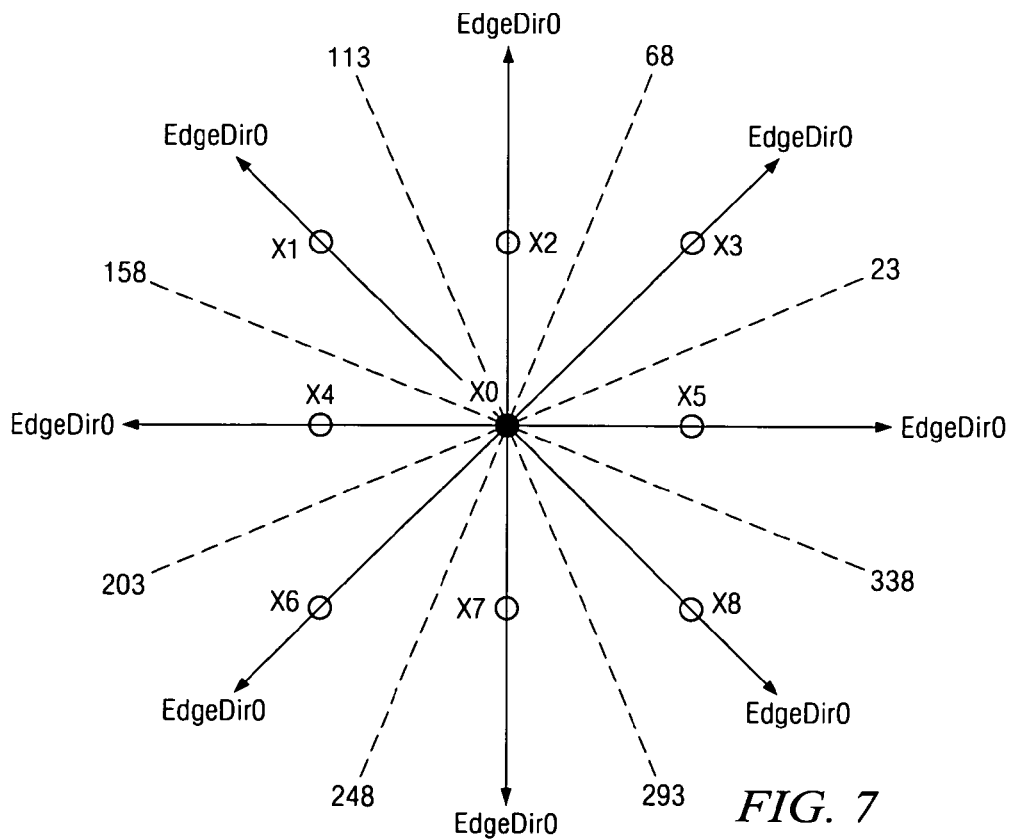
FIG. 7 illustrates an example of adjacent pixels selection based on the edge direction of central pixel.

At step 1, according to the edge direction (EdgeDir0) of the central pixel X0 as shown in FIG. 7, where an exemplary 3×3 neighborhood window as shown in FIG. 3 is utilized herein to illustrate the detection of corners, two adjacent edge directions, EdgeDirL and EdgeDirR, are selected from eight (8) neighborhood pixels as described by the following pseudocode:

```
If(EdgeDir0>0  &&  EdgeDir0<23  ||  EdgeDir0>=158  &&
EdgeDir0<203  || EdgeDir0>=338 && EdgeDir0<360)
{
  EdgeDirL=EdgeDir4;
  EdgeDirR=EdgeDir5;
}
If(EdgeDir0>=23 && EdgeDir0<68 || EdgeDir0>=203 &&
EdgeDir0<248)
{
  EdgeDirL=EdgeDir6;
  EdgeDirR=EdgeDir3;
}
If(EdgeDir0>=68 && EdgeDir0<113 || EdgeDir0>=248 &&
EdgeDir0<293)
{
  EdgeDirL=EdgeDir7;
  EdgeDirR=EdgeDir2;
}
If(EdgeDir0>=113 && EdgeDir0<158 || EdgeDir0>=293 &&
EdgeDir0<338)
{
  EdgeDirL=EdgeDir1;
  EdgeDirR=EdgeDir8;
}
```

Then, the absolute difference between EdgeDirL and EdgeDirR is derived by the following Equation 4:

$$DiffDir=|EdgeDirL-EdgeDirR| \qquad [\text{Eqn. 4}]$$

If the difference DiffDir is larger than a predefined corner detection threshold, the central pixel X0 is regarded as a corner candidate. Otherwise, it is not a corner.

At step 2, the central pixel is identified as a corner if there are two or more pixels within a 3×3 neighborhood window are candidates of the corner. Otherwise, it is not a corner.

Figure 8:
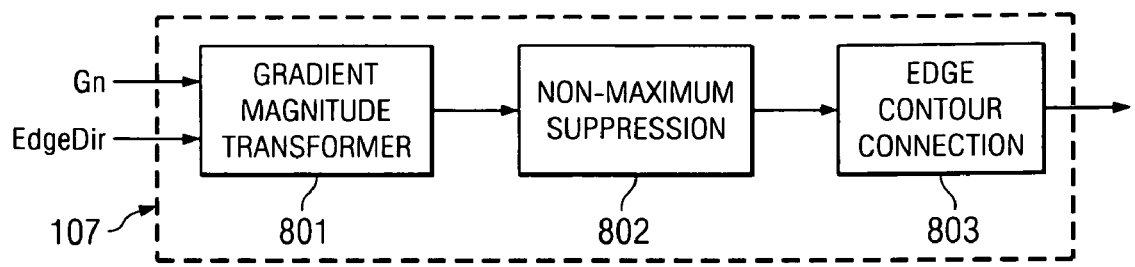
FIG. 8 illustrates a functional block diagram of the edge contour detection in sub-pixel accuracy module in accordance with one embodiment of the present invention.

Now referring back to FIG. 1, the edge contour detection in sub-pixel accuracy module 107 is operably coupled with the local image feature analysis module 106, receiving the information of Gn and EdgeDir respectively from the gradient magnitude estimator 202 and edge direction estimator 203 of the local image feature analysis module 106 to detect the edge contour in sub-pixel accuracy. FIG. 8 shows a functional block diagram of the edge contour detection in sub-pixel accuracy module 107 in accordance with one embodiment of the present invention. The edge contour detection module 107 comprises a gradient magnitude transformer 801, a non-maximum suppression circuit 802, and an edge contour connection circuit 803.

The gradient magnitude transformer 801 receives the information of Gn and EdgeDir respectively from the gradient magnitude estimator 202 and edge direction estimator 203 of the local image feature analysis module 106, transforming the estimated gradient magnitudes into high resolution lattices using cubic interpolation. In certain embodiments, other interpolation methods such as linear interpolation or quadratic interpolation may also be used.

The non-maximum suppression circuit 802 uses the local maximum of the gradient magnitude along the perpendicular axis of the edge direction to determine which pixel is considered as an edge pixel and need not to be suppressed. The edge contour connection circuit 803 connects the broken edge contour that is caused by the operator output fluctuating above and below the threshold. In one embodiment, a high threshold T1 and a low threshold T2 are used. If a gradient magnitude is the local maximum and greater than T1, it is presumed as an edge pixel. Then any pixel connected to this pixel with local maximum gradient magnitude greater than T2 is also detected as edge pixel.

Figure 9:
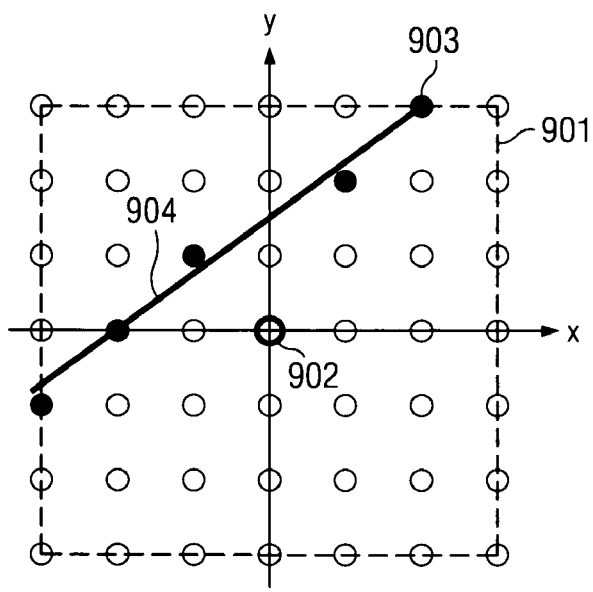
FIG. 9 illustrates an exemplary edge distance calculation window.

Still referring back to FIG. 1, the local edge distance estimation module 108 is operably coupled with the edge contour detection in sub-pixel accuracy module 107, receiving the detected edge contour information and estimating the local edge distance from the to-be-interpolated pixel to the local edge contour. FIG. 9 shows an exemplary edge distance calculation window 901, where the width and height of the calculation window are defined by the following Equations 5 and 6:

$$WinSizeX=3*zoomx \qquad [Eqn. 5]$$

$$WinSizeY=3*zoomy \qquad [Eqn. 6]$$

Where zoomx and zoomy are rescaling factors in horizontal and vertical directions. The calculation window 901 includes the Pixel to be interpolated p(x, y) 902, the Edge pixels $p_i(x_i, y_i)$ 903, and the Edge contour 904.

In horizontal interpolation, the distance $Dist_x$ from the to-be-interpolated pixel to the local edge contour is calculated according to the following Equation 7:

$$Dist_x = x - m_x \qquad [Eqn. 7]$$

While in vertical interpolation, the distance $Dist_y$ from the to-be-interpolated pixel to local edge contour is calculated according to the following Equation 8:

$$Dist_y = y - m_y \qquad [Eqn. 8]$$

Where x and y are horizontal and vertical positions of the to-be-interpolated pixel; $m_x$ and $m_y$ are the average values of horizontal position and vertical position of the pixels on the edge contour in the calculation window, which can be calculated according to the following Equations 9 and 10:

$$m_x = \frac{1}{n}\sum_{i=0}^{n-1} x_i \qquad [Eqn. 9]$$

$$m_y = \frac{1}{n}\sum_{i=0}^{n-1} y_i \qquad [Eqn. 10]$$

where n is the number of pixels on the edge contour.

Figure 10:
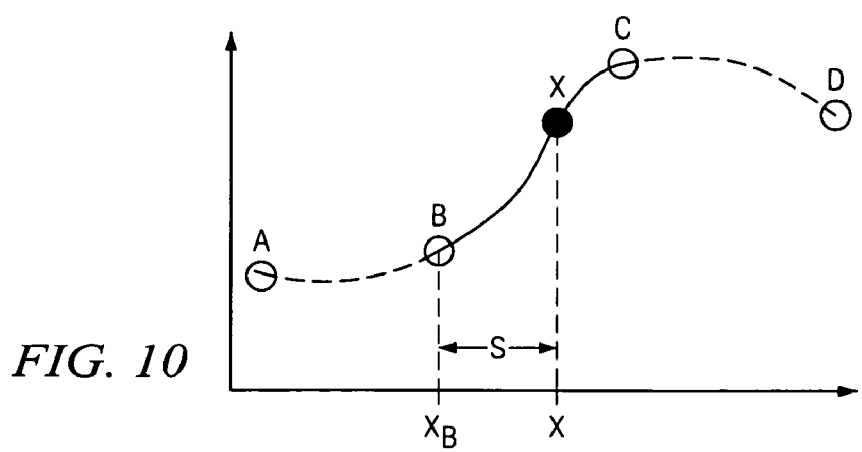
FIG. 10 illustrates an exemplary cubic interpolation using four support pixels.

Now the interpolation process of the present invention will be illustrated by cubic interpolation with four (4) input support pixels. The cubic interpolation uses the third order polynomial function based on four (4) input support pixels to generate the interpolated pixel. As shown in FIG. 10, A, B, C and D are four (4) input support pixels, X is the pixel to be interpolated, and s is the phase of the interpolation kernel. Then, the value of X can be calculated by the following Equation 11:

$$y(x) = \sum_{n=A,B,C,D} y_n * f_n(s) \qquad [Eqn. 11]$$

Where $f_n(s)(n=A,B,C,D)$ are four control synthesis functions which can be defined by the following Equations 12, 13, 14, and 15 respectively:

$$f_A(s)=(-s^3+2*s^2-s)/2 \qquad [Eqn. 12]$$

$$f_B(s)=(3*s^3-5*s^2+2)/2 \qquad [Eqn. 13]$$

$$f_C(s)=(3*s^3+4*s^2+s)/ \qquad [Eqn. 14]$$

$$f_D(s)=(s^3-s^2)/2 \qquad [Eqn. 15]$$

Where the phase s is defined as the pixel distance from the position of the to-be-interpolated pixel X to the second support pixel B.

Figure 11:
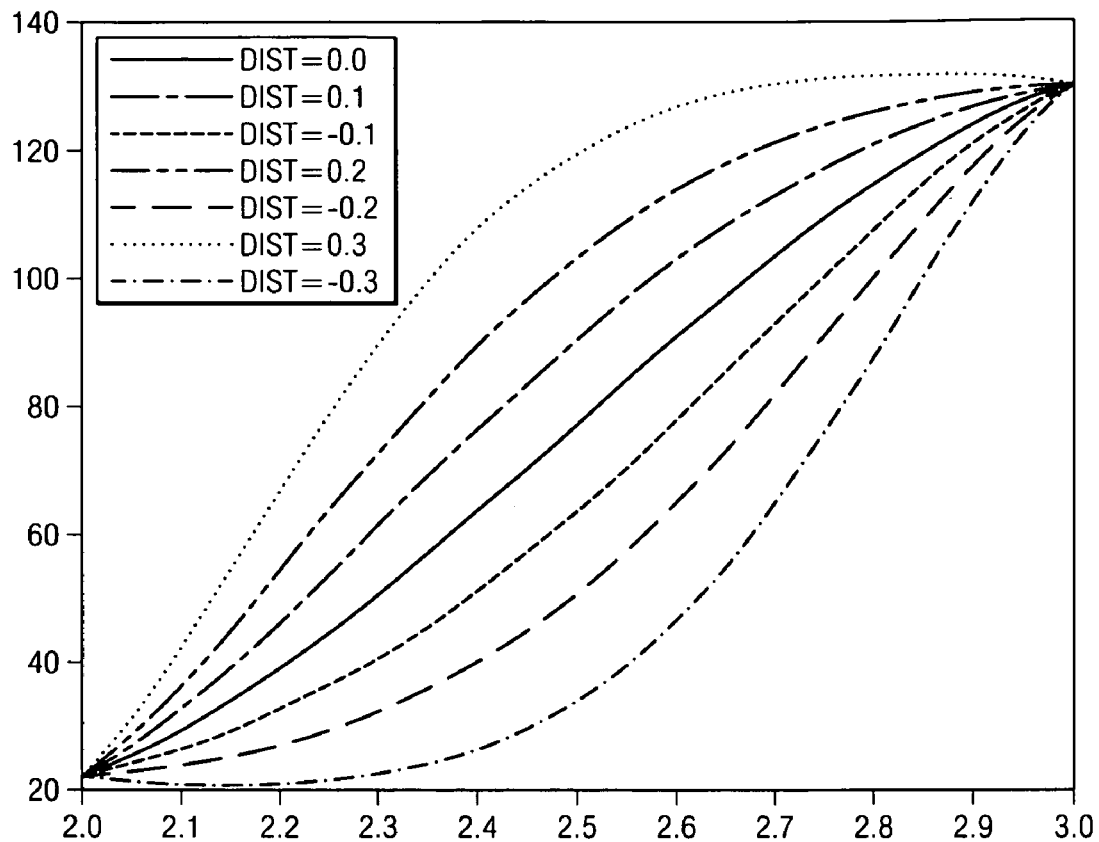
FIG. 11 illustrates some examples of the interpolation curves driven by different edge distance values.

It is apparent that the phase s is a determinant to the interpolation. When the phase s does not include any local edge information, the interpolation will result in blurred edges and jaggedness along the edges in a 2D case. By incorporating the local edge contour information obtained from the edge contour detection in sub-pixel accuracy module 107, the phase s can be modified into a phase s' that is adaptive to the local edge information according to the following Equation 16:

$$s'=Dist \cdot s \cdot (s-1)+s \qquad [Eqn. 16]$$

Where s is the unmodified phase which is defined as the pixel distance from the to-be-interpolated pixel to the support pixel B; Dist is defined as the edge distance from the to-be-interpolated pixel to the local edge contour as shown in FIG. 9. With such a control of edge distance, the phase of interpolation kernel will be changed adaptively to local edge information. FIG. 11 illustrates some examples of the interpolation curves driven by different edge distance values.

Now referring back to FIG. 1, the adaptive horizontal phase control module 104 calculates the phase in the horizontal interpolation according to the following Equation 17:

$$s'=Dist_x \cdot s \cdot (s-1)+s \qquad [Eqn. 17]$$

Similarly, the adaptive vertical phase control module 105 calculates the phase in the horizontal interpolation according to the following Equation 18:

$$s'=Dist_y \cdot s \cdot (s-1)+s \qquad [Eqn. 18]$$

Generally, there is no clear edge contour passing through the calculation window at corner region. To avoid estimation error, the edge distance is set to zero if the pixel to be interpolated is detected in corner region.

Figure 12:
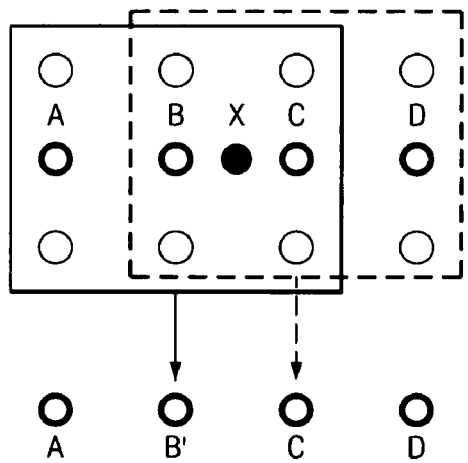
FIG. 12 illustrates an exemplary edge directional filtering before horizontal interpolation.

Still referring back to FIG. 1, the edge directional filters 109, 110 are applied on the input support pixels from the input image data module 101 before performing interpolation process. This procedure can reduce the noise and jaggedness caused by some other image pre-processing. FIG. 12 shows an exemplary processing window of edge directional filtering before horizontal interpolation, where pixels A, B, C, D are four original support pixels that will be used in interpolation process to generate the interpolated pixel X. The edge directional filter 109 is applied on the support pixel B and C to obtain the filtered pixels, B' and C'. Then the pixels A, B', C' and D are used in interpolation process instead of A, B, C and D.

Figure 13:
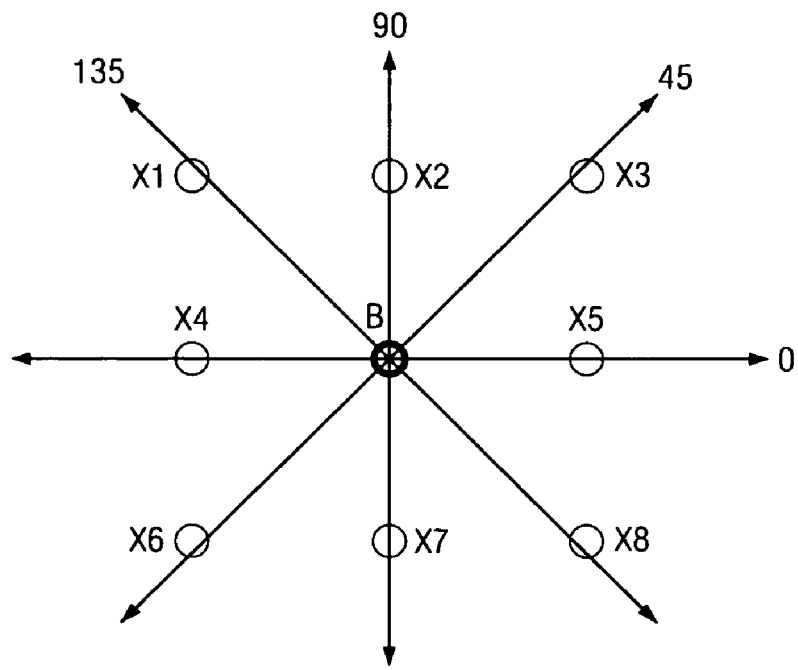
FIG. 13 illustrates an exemplary 3×3 neighborhood window that is used to filter the support pixel B.

The edge directional filters 109, 110 may be a 1D low pass filter which is applied on the support pixels and their two adjacent pixels. The adjacent pixels are selected from a 3×3 neighborhood window based on the edge direction of the support pixels. FIG. 13 shows an exemplary 3×3 neighborhood window that is used to filter the support pixel B. The edge direction of B is quantized into one of the four directions: horizontal (0), diagonal (45), vertical (90) and anti-diagonal (135), which can be obtained by the following Equation 19:

$$DirB = \begin{cases} 0 & \text{if } \begin{pmatrix} 0 \leq EdgeDirB < 23 \| \\ 180 \leq EdgeDirB < 203 \end{pmatrix} \\ 45 & \text{if } \begin{pmatrix} 23 \leq EdgeDirB < 68 \| \\ 203 \leq EdgeDirB < 248 \end{pmatrix} \\ 90 & \text{if } \begin{pmatrix} 68 \leq EdgeDirB < 113 \| \\ 248 \leq EdgeDirB < 293 \end{pmatrix} \\ 135 & \text{if } \begin{pmatrix} 113 \leq EdgeDirB < 158 \| \\ 293 \leq EdgeDirB < 338 \end{pmatrix} \end{cases} \quad [\text{Eqn. 19}]$$

According to the quantized edge direction, pixel B can be filtered by the following Equation 20:

$$B' = \begin{cases} X'(4)+2*B+X'(5) & \text{if } (DirB = 0) \\ X'(6)+2*B+X'(3) & \text{if } (DirB = 45) \\ X'(2)+2*B+X'(7) & \text{if } (DirB = 90) \\ X'(1)+2*B+X'(8) & \text{if } (DirB = 135) \end{cases} \quad [\text{Eqn. 20}]$$

Where B' is the filtered value of pixel B; X'(i) are the neighborhood pixels of pixel B which can be defined by the following Equation 21:

$$X'(i) = \begin{cases} X(i) & \text{if } (|X(i) - B| < G_B) \\ B & \text{else} \end{cases} \quad (i = 1 \ldots 8) \quad [\text{Eqn. 21}]$$

And $G_B$ is a threshold which is related to the gradient magnitude of the pixel B.

Now referring back to FIG. 1, the horizontal interpolation module 102 is operably coupled with the upstream edge directional filter 109 and adaptive horizontal phase control module 104, first resealing the input image data in horizontal interpolation. The vertical interpolation module 103 is operably coupled with the upstream edge directional filter 110 and adaptive vertical phase control module 105, resealing the horizontally interpolated image data in vertical interpolation. In each of the interpolation, the phase of interpolation kernel is calculated based on the pixel's location in output space. Then, the phase value is modified by the phase controls 104, 105 which are adaptive to the local edge distance. Then, the modified phase value is used in 1D cubic interpolation kernel of the horizontal and vertical interpolation modules 102, 103 to calculate the output interpolated pixel value. To get the edge distance information, local image features (e.g., local gradient magnitude, edge direction and corner) are estimated in the local image feature analysis module 106, and then transformed to high resolution space in sub-pixel accuracy to detect the edge contour in the edge contour detection in sub-pixel accuracy module 107. The edge directional filters 109, 110 are applied on the input image data to reduce the noise and jaggedness along the edge which are caused by other image processing techniques (e.g., de-interlacing) before the resealing process.

Figure 14:
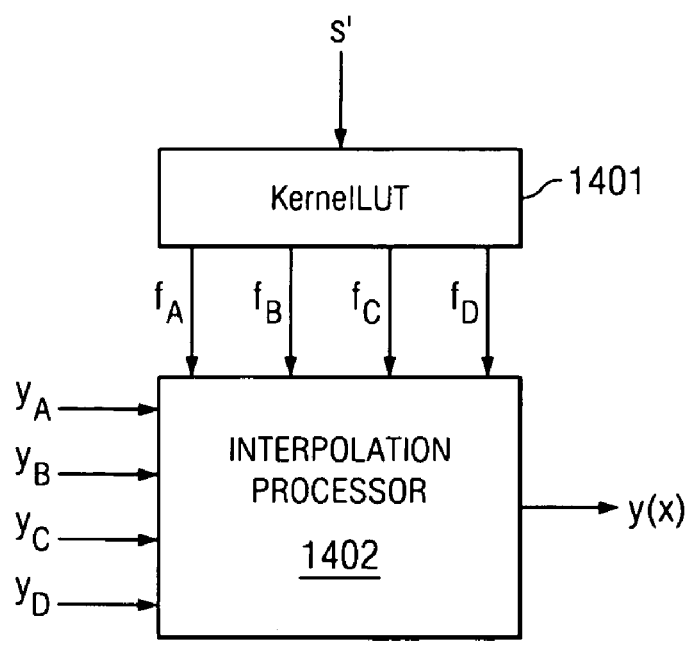
FIG. 14 illustrates a block diagram of interpolation processor in accordance with one embodiment of the present invention.

In both horizontal and vertical interpolations, the 1D cubic interpolation is implemented by using a look-up table as shown in FIG. 14. In this figure, KernelLUT 1401 is a look-up table that stores the values of four control synthesis functions. The contents of the look-up table can be calculated by Equations 12 through 15. The size of this look-up table depends on the resolution of interpolation. It is initialized at the beginning of image resealing process. The interpolation processor 1402 is used to calculate the interpolated pixel value y(x) using the interpolation kernel that is stored in KernelLUT 1401, which is formulated by the following Equation 22:

$$y(x) = y_A * f_A(s') + y_B * f_B(s') + y_C * f_C(s') + y_D * f_D(s') \quad [\text{Eqn. 22}]$$

A video image processing system is described that rescales image data with an edge adaptive phase control in its interpolation process so that the resealed images have sharp and jaggedness-free edges.

While this detailed description has set forth some embodiments of the present invention, the appended claims are sufficiently supported to cover and will cover other embodiments of the present invention which differ from the described embodiments according to various modifications and improvements. For example, edge directional filtering can be done first either horizontally or vertically, and interpolation can also be done first either horizontally or vertically without deviating from the principles of the present invention.

What is claimed is:

1. A video image processing system comprising:
   an input image data module configured to receive and make input image data available for further processing;
   a local image feature analysis module operably coupled with the input image data module, operable to receive the input image data and analyze the local features of the input image data, wherein the local features include gradient magnitude, edge direction and corners;
   an edge contour detection in sub-pixel accuracy module operably coupled with the local image feature analysis module, operable to receive the information of gradient magnitude and edge direction to detect the edge contour in sub-pixel accuracy;
   a local edge distance estimation module operably coupled with the edge contour detection in sub-pixel accuracy module, operable to receive the detected edge contour information and estimating the local edge distance from a to-be-interpolated pixel to the local edge contour;
   a pair of edge directional filters operably coupled with the input image data module, operable to filter the input image data before performing interpolation process;
   an adaptive horizontal phase control module and an adaptive vertical phase control module operably coupled with the local edge distance estimation module, operable to modify the phase value adaptive to the local edge distance;
   a horizontal interpolation module operably coupled with one of the edge directional filters and adaptive horizontal phase control module, operable to rescale the input image data in horizontal interpolation; and
   a vertical interpolation module operably coupled with one of the edge directional filters and adaptive vertical phase control module, operable to rescale the horizontally interpolated image data in vertical interpolation, wherein the video image processing system is operable to interpolate the input image data, resulting in an output image with sharp and jaggedness-free edges.

2. The video image processing system of claim 1, wherein the local image feature analysis module comprises:
   a low pass filter operably coupled with the input image data module, operable to receive and filter the input image data to reduce the noise;
   a gradient magnitude estimator operably coupled with the low pass filter, operable to receive the filtered input image data and to estimate the gradient magnitude in the horizontal direction $G_x$ and the vertical direction $G_y$, in an nXn neighborhood window, where the n is any integral;

an edge direction estimator operably coupled with the gradient magnitude estimator, operable to receive the estimated gradient values $G_x$ and $G_y$, and to extract the edge direction from the quotient defined by $|G_y|/|G_x|$ (when $|G_y|<|G_x|$) or $|G_x|/|G_y|$ (when $|G_y|>|G_x|$) combined with the signs of $G_x$ and $G_y$, respectively; and a corner detector operably coupled with the edge detection estimator, operable to receive the estimated edge directions to detect corners.

3. The video image processing system of claim 2, wherein the low pass filter is a Gaussian lowpass filter.

4. The video image processing system of claim 2, wherein the gradient magnitude estimator is operable to first estimate the gradient magnitudes in the horizontal direction $G_x$ and the vertical direction $G_y$, for a 3×3 window according to the following equations:

$$G_x=(X1+2*X2+X3-(X6+2*X7+X8))/4; \text{ and}$$

$$G_y=(X1+2*X4+X6-(X3+2*X5+X8))/4;$$

and then estimate the local gradient magnitude according to the following equation:

$$G_n=(|G_x|+|G_y|)/2.$$

5. The video image processing system of claim 2, wherein the edge direction estimator comprises:

a pair of absolute value circuits for operable to receive the gradient magnitudes $G_x$ and $G_y$ and output only the magnitude of the input signals;

a subtraction circuit operably coupled with the pair of absolute value circuits, operable to output the difference between the two input signals, i.e., $|G_x|-|G_y|$;

a switching circuit operable to receive $|G_x|$ and $|G_y|$ as major inputs and a signal indicative of the sign of $|G_x|-|G_y|$ as a control input; wherein the control input ensures that the switch is operative such that the larger input signal is always used as divisor, and the smaller input signal is always used as dividend;

a divider circuit operable to generate a quotient value;

a logic decoder operable to receive three digital signals representing the signs of $G_x$ and $G_y$ and $|G_x|-|G_y|$ and decode them to create the three control bits;

a multiplexer operable to generate the value of edge direction; and a limiter operable to ensure that the eventual output of edge direction is limited in the range of 0 to 360.

6. The video image processing system of claim 2, wherein the system is operable such that the detection of the corners in an exemplary 3×3 neighborhood window includes:

according to the edge direction (EdgeDir0) of the central pixel X0, two adjacent edge directions, EdgeDirL and EdgeDirR, are selected from 8 neighborhood pixels as described by the following pseudo code:

```
If(EdgeDir0>0 && EdgeDir0<23 || EdgeDir0>=158 && EdgeDir0<203 || EdgeDir0>=338 && EdgeDir0<360)
{
  EdgeDirL=EdgeDir4;
  EdgeDirR=EdgeDir5;
}
If(EdgeDir0>=23 && EdgeDir0<68 || EdgeDir0>=203 && EdgeDir0<248)
{
  EdgeDirL=EdgeDir6;
  EdgeDirR=EdgeDir3;
}
If(EdgeDir0>=68 && EdgeDir0<113 || EdgeDir0>=248 && EdgeDir0<293)
{
  EdgeDirL=EdgeDir7;
  EdgeDirR=EdgeDir2;
}
If(EdgeDir0>=113 && EdgeDir0<158 || EdgeDir0>=293 && EdgeDir0<338)
{
  EdgeDirL=EdgeDir1;
  EdgeDirR=EdgeDir8;
}
``` then, the absolute difference between EdgeDirL and EdgeDirR is derived by the following equation:

$$\text{DiffDir}=|\text{EdgeDir}L-\text{EdgeDir}R|$$

whereby if the difference DiffDir is larger than a predefined corner detection threshold, the central pixel X0 is regarded as a corner candidate; otherwise, it is not a corner; and whereby the central pixel is identified as a corner if there are two or more pixels within the 3×3 neighborhood window are candidates of the corner; otherwise, it is not a corner.

7. The video image processing system of claim 1, wherein the edge contour detection module comprises:

a gradient magnitude transformer operable to receive the information of the gradient magnitude and edge direction from the local image feature analysis module and transform the estimated gradient magnitudes into high resolution lattices using interpolation;

a non-maximum suppression circuit operable to use the local maximum of the gradient magnitude along the perpendicular axis of the edge direction to determine which pixel is considered as an edge pixel and need not to be suppressed; and an edge contour connection circuit operable to connect the broken edge contour which is caused by the operator output fluctuating above and below a threshold.

8. The video image processing system of claim 1, wherein the system is operable such that the interpolation is a cubic interpolation, a linear interpolation or a quadratic interpolation.

9. The video image processing system of claim 1, wherein the system is operable such that the calculation of the local edge distance includes:

in horizontal interpolation, the distance $\text{Dist}_x$ from the to-be-interpolated pixel to the local edge contour is calculated according to the following equation:

$$\text{Dist}_x=x-m_x;$$

in vertical interpolation, the distance $\text{Dist}_y$ from the to-be-interpolated pixel to local edge contour is calculated according to the following equation:

$$\text{Dist}_y=y-m_y;$$

where x and y are horizontal and vertical positions of the to-be-interpolated pixel; $m_x$ and $m_y$ are the average values of horizontal position and vertical position of the pixels on the edge contour, and where the $m_x$ and $m_y$ are calculated according to the following equations:

$$m_x = \frac{1}{n}\sum_{i=0}^{n-1} x_i; \text{ and } m_y = \frac{1}{n}\sum_{i=0}^{n-1} y_i;$$

where n is the number of pixels on the edge contour.

10. The video image processing system of claim 1, wherein the pair of edge directional filters are an 1D low pass filter which is operable to apply on support pixels and their two adjacent pixels, where the adjacent pixels are selected from a neighborhood window based on the edge direction of the support pixels.

11. The video image processing system of claim 10, wherein the system is operable such that the edge direction of one support pixel B is quantized into one of the four directions: horizontal (0), diagonal (45), vertical (90) and anti-diagonal (135), which can be obtained by the following equation (19):

$$DirB = \begin{cases} 0 & \text{if } \begin{pmatrix} 0 \le EdgeDirB < 23 \| \\ 180 \le EdgeDirB < 203 \end{pmatrix} \\ 45 & \text{if } \begin{pmatrix} 23 \le EdgeDirB < 68 \| \\ 203 \le EdgeDirB < 248 \end{pmatrix} \\ 90 & \text{if } \begin{pmatrix} 68 \le EdgeDirB < 113 \| \\ 248 \le EdgeDirB < 293 \end{pmatrix} \\ 135 & \text{if } \begin{pmatrix} 113 \le EdgeDirB < 158 \| \\ 293 \le EdgeDirB < 338 \end{pmatrix} \end{cases}$$

whereby according to the quantized edge direction, the support pixel B can be filtered by the following equation:

$$B' = \begin{cases} X'(4) + 2*B + X'(5) & \text{if } (DirB = 0) \\ X'(6) + 2*B + X'(3) & \text{if } (DirB = 45) \\ X'(2) + 2*B + X'(7) & \text{if } (DirB = 90) \\ X'(1) + 2*B + X'(8) & \text{if } (DirB = 135) \end{cases}$$

where B' is the filtered value of the support pixel B; X'(i) are the neighbourhood pixels of support pixel B which can be defined by the following equation:

$$X'(i) = \begin{cases} X(i) & \text{if } (|X(i) - B| < G_B) \\ B & \text{else} \end{cases} (i = 1 \ldots 8)$$

where $G_B$ is a threshold which is related to the gradient magnitude of the support pixel B.

12. The video image processing system of claim 1, wherein the system is operable such that in each of the interpolation, the phase of interpolation kernel is calculated based on the pixel's location in output space.

13. A method of processing video images, said method including the following steps of:
receiving and making input image data available for further processing;
analyzing the local features of the input image data, wherein the local features include gradient magnitude, edge direction and corners;
receiving the information of gradient magnitude and edge direction to detect the edge contour in sub-pixel accuracy;
receiving the detected edge contour information and estimating the local edge distance from a to-be-interpolated pixel to the local edge contour;
filtering the input image data before performing interpolation process;
modifying the phase value adaptive to the local edge distance;
rescaling the input image data in horizontal interpolation using the modified phase value; and
rescaling the horizontally interpolated image data in vertical interpolation using modified phase value, wherein interpolated video images with sharp and jaggedness-free edges are generated.

14. The method of claim 13, wherein the step of analyzing the local features comprises:
filtering the input image data to reduce the noise with a low pass filter;
estimating by a gradient magnitude estimator the gradient magnitude in the horizontal direction $G_x$ and the vertical direction $G_y$ in an nXn neighborhood window, where the n is any integral;
extracting by an edge direction estimator the edge direction from the quotient defined by $|G_y|/|G_x|$ (when $|G_y|<|G_x|$) or $|G_x|/|G_y|$ (when $|G_y|>|G_x|$) combined with the signs of $G_x$ and $G_y$, respectively; and
detecting corners by a corner detector.

15. The method of claim 14, wherein the low pass filter is a Gaussian lowpass filter.

16. The method of claim 14, wherein the step of estimating the gradient magnitude includes: first estimating the gradient magnitudes in the horizontal direction $G_x$ and the vertical direction $G_y$ for a 3×3 window according to the following equations:

$$G_x = (X1 + 2*X2 + X3 - (X6 + 2*X7 + X8))/4; \text{ and}$$

$$G_y = (X1 + 2*X4 + X6 - (X3 + 2*X5 + X8))/4;$$

and then estimating the local gradient magnitude according to the following equation:

$$G_n = (|G_x| + |G_y|)/2.$$

17. The method of claim 14, wherein the step of extracting the edge direction includes:
receiving the gradient magnitudes $G_x$ and $G_y$ and outputting only the magnitude of the input signals;
outputting the difference between the two input signals, i.e., $|G_x| - |G_y|$;
receiving $|G_x|$ and $|G_y|$ as major inputs and a signal indicative of the sign of $|G_x| - |G_y|$ as a control input; wherein the control input ensures that the switch is operative such that the larger input signal is always used as divisor, and the smaller input signal is always used as dividend;
generating a quotient value;
receiving three digital signals representing the signs of $G_x$ and $G_y$ and $|G_x| - |G_y|$ and decoding them to create the three control bits;
generating the value of edge direction; and
ensuring that the eventual output of edge direction is limited in the range of 0 to 360.

18. The method of claim 14, wherein the step of detection of the corners in an exemplary 3×3 neighborhood window includes:
according to the edge direction (EdgeDir0) of the central pixel X0, two adjacent edge directions, EdgeDirL and EdgeDirR, are selected from 8 neighborhood pixels as described by the following pseudocode:

```
If(EdgeDir0>0  &&  EdgeDir0<23  ||  EdgeDir0>=158  &&
EdgeDir0<203  || EdgeDir0>=338 && EdgeDir0<360)
{
  EdgeDirL=EdgeDir4;
  EdgeDirR=EdgeDir5;
}
If(EdgeDir0>=23 && EdgeDir0<68 || EdgeDir0>=203 &&
EdgeDir0<248)
{
  EdgeDirL=EdgeDir6;
  EdgeDirR=EdgeDir3;
}
If(EdgeDir0>=68 && EdgeDir0<113 || EdgeDir0>=248 &&
EdgeDir0<293)
{
  EdgeDirL=EdgeDir7;
  EdgeDirR=EdgeDir2;
}
If(EdgeDir0>=113 && EdgeDir0<158 || EdgeDir0>=293 &&
EdgeDir0<338)
{
  EdgeDirL=EdgeDir1;
  EdgeDirR=EdgeDir8;
}
``` then, the absolute difference between EdgeDirL and EdgeDirR is derived by the following equation:

DiffDir=|EdgeDir$L$−EdgeDir$R$| whereby if the difference DiffDir is larger than a predefined corner detection threshold, the central pixel X0 is regarded as a corner candidate; otherwise, it is not a corner; and
whereby the central pixel is identified as a corner if there are two or more pixels within the 3×3 neighborhood window are candidates of the corner; otherwise, it is not a corner.

19. The method of claim 13, wherein the step of detecting edge contour comprises:
receiving the information of the gradient magnitude and edge direction and transforming the estimated gradient magnitudes into high resolution lattices using interpolation;
using the local maximum of the gradient magnitude along the perpendicular axis of the edge direction to determine which pixel is considered as an edge pixel and need not to be suppressed; and
connecting the broken edge contour which is caused by the operator output fluctuating above and below a threshold.

20. The method of claim 13, wherein the interpolation is a cubic interpolation, a linear interpolation or a quadratic interpolation.

21. The method of claim 13, wherein the step of the calculation of the local edge distance includes:
in horizontal interpolation, the distance $Dist_x$ from the to-be-interpolated pixel to the local edge contour is calculated according to the following equation:

$Dist_x = x - m_x$;

in vertical interpolation, the distance $Dist_y$ from the to-be-interpolated pixel to local edge contour is calculated according to the following equation:

$Dist_y = y - m_y$;

where x and y are horizontal and vertical positions of the to-be-interpolated pixel; $m_x$ and $m_y$ are the average values of horizontal position and vertical position of the pixels on the edge contour, and where the $m_x$ and $m_y$ are calculated according to the following equations:

$$m_x = \frac{1}{n}\sum_{i=0}^{n-1} x_i; \text{ and } m_y = \frac{1}{n}\sum_{i=0}^{n-1} y_i;$$

where n is the number of pixels on the edge contour.

22. The method of claim 13, wherein the step of filtering the input image data before performing interpolation process includes using an 1D low pass filter to filter support pixels and their two adjacent pixels, where the adjacent pixels are selected from a neighbourhood window based on the edge direction of the support pixels.

23. The method of claim 22, wherein the edge direction of one support pixel B is quantized into one of the four directions: horizontal (0), diagonal (45), vertical (90) and anti-diagonal (135), which can be obtained by the following equation (19):

$$DirB = \begin{cases} 0 & \text{if } \begin{pmatrix} 0 \le EdgeDirB < 23|| \\ 180 \le EdgeDirB < 203 \end{pmatrix} \\ 45 & \text{if } \begin{pmatrix} 23 \le EdgeDirB < 68|| \\ 203 \le EdgeDirB < 248 \end{pmatrix} \\ 90 & \text{if } \begin{pmatrix} 68 \le EdgeDirB < 113|| \\ 248 \le EdgeDirB < 293 \end{pmatrix} \\ 135 & \text{if } \begin{pmatrix} 113 \le EdgeDirB < 158|| \\ 293 \le EdgeDirB < 338 \end{pmatrix} \end{cases}$$

whereby according to the quantized edge direction, the support pixel B can be filtered by the following equation:

$$B' = \begin{cases} X'(4) + 2*B + X'(5) & \text{if } (DirB = 0) \\ X'(6) + 2*B + X'(3) & \text{if } (DirB = 45) \\ X'(2) + 2*B + X'(7) & \text{if } (DirB = 90) \\ X'(1) + 2*B + X'(8) & \text{if } (DirB = 135) \end{cases}$$

where B' is the filtered value of the support pixel B; X'(i) are the neighbourhood pixels of support pixel B which can be defined by the following equation:

$$X'(i) = \begin{cases} X(i) & \text{if } (|X(i) - B| < G_B) \\ B & \text{else} \end{cases} (i = 1 \ldots 8)$$

where $G_B$ is a threshold which is related to the gradient magnitude of the support pixel B.

24. The method of claim 13, wherein in each of the interpolation, the phase of interpolation kernel is calculated based on the pixel's location in output space.

* * * * *